| United States Patent [19] | [11] Patent Number: 4,750,948 |
|---|---|
| Consaul et al. | [45] Date of Patent: Jun. 14, 1988 |

[54] WELDING FLUX

[75] Inventors: Frank I. Consaul; Robert A. Bishel, both of Huntington, W. Va.

[73] Assignee: Inco Alloys International, Inc., Huntington, W. Va.

[21] Appl. No.: 53,795

[22] Filed: May 26, 1987

[51] Int. Cl.$^4$ .............................................. B23K 35/34
[52] U.S. Cl. .................................... 148/24; 148/26
[58] Field of Search ................................. 148/24, 26

[56] References Cited

U.S. PATENT DOCUMENTS

| 2,719,801 | 10/1955 | Stringham | 148/26 |
|---|---|---|---|
| 2,951,000 | 8/1960 | Kennedy | 148/26 |
| 2,965,524 | 12/1960 | Claussen | 148/26 |
| 3,745,294 | 7/1973 | Arikawa | 148/24 |
| 3,919,517 | 11/1975 | Ishizaki | 148/24 |
| 4,057,706 | 11/1977 | Tanigaki | 148/24 |

Primary Examiner—Peter D. Rosenberg
Attorney, Agent, or Firm—Raymond J. Kenny; Francis J. Mulligan, Jr.

[57] ABSTRACT

A flux for submerged-arc welding comprising a balanced combination of calcium fluoride, alumina, zirconia, cryolite, magnetite, manganese metal, nickel-niobium alloy, chromium-molybdenum alloy and alkali metal silicate binder.

5 Claims, No Drawings

WELDING FLUX

The present invention is directed to a welding flux and more particularly to a welding flux adapted to be used in "submerged-arc" welding of nickel-base, chromium-containing alloys.

PROBLEM

Nickel-base, chromium-containing alloys are known which have good strength and corrosion resistance. In particular, an alloy sold under the designation INCONEL ™ alloy 625 is specifically known as having high strength, excellent fabricability and outstanding corrosion resistance. This alloy which is serviceable at temperatures ranging from cryogenic to about 1000° C. contains by weight about 20–23% chromium, up to 5% iron, 8–10% molybdenum, 3.15–4.15% niobium plus tantalum, up to 0.1% carbon, balance essentially nickel along with up to small amounts of manganese, silicon, aluminum, titanium and cobalt which do not affect the characteristics of the alloy.

INCONEL ™ alloy 625 can be used for sea water applications, a variety of applications in the aerospace field and in chemical and power equipment, e.g. as reactor-core and control-rod components in nuclear water reactors. For many of these uses it is desirable to fabricate components by submerged-arc welding. Up to now there has not been available a satisfactory flux which will enable reliable submerged-arc welding on INCONEL ™ alloy 625 and thus this useful welding process has not been recommended for this alloy.

It is an object of the present invention to provide a novel flux composition which will facilitate submerged-arc welding of alloys such as INCONEL ™ alloy 625 and other alloys such as the cryogenically useful 9% nickel steel.

DESCRIPTION OF THE INVENTION

The present invention contemplates a welding flux containing in percent by weight about 40–55% calcium fluoride, about 16–22% alpha alumina, about 7–16% zirconia, about 4.5–8% sodium aluminum fluoride ($Na_3AlF_6$ cryolite) about 2.5–4% $Fe_3O_4$, about 0.8–1.8% manganese metal, up to about 1.8% of alloy consisting essentially of 40–60% niobium, balance nickel, about 0.2–1.8% of alloy consisting essentially of about 30–70% chromium, balance molybdenum, about 1.5–3% alkali metal oxide from the group of sodium oxide, potassium oxide and lithium oxide, about 4 to 8% of silica and up to 0.6% carbon. Alternatively, the flux of the present invention can be described as containing all of the named ingredients other than calcium fluoride with the balance of the flux being calcium fluoride in an amount of about 40–55% by weight.

The welding flux of the present invention is made by dry blending powders of calcium fluoride, alumina, zirconia, cryolite, magnetite, electrolytic manganese powder, chromium-molybdenum powder and nickel-columbium powder. The powders which are dry blended are generally sufficiently fine so as to pass through a 149 micrometer screen. After being thoroughly dry blended, an aqueous binder containing alkali metal silicate and a carbohydrate (e.g. invert sugar) is added to the dry blended ingredients. The dry and wet ingredients are then thoroughly blended and baked in air at about 480° to 540° C. for about 1–3 hours. After baking, the flux is removed from the baking equipment and crushed to convenient size, e.g. to pass through a 2000 micrometer screen. The aforestated flux composition is based upon the premise that the manufacturing process removes all free water from the flux together with water in chemical combination in the carbohydrate (sugar). A range of composition plus an advantageous example for the dry blended ingredients alone is set forth in Table I. It is to be observed that the amounts of ingredients set forth in Table I as advantageous are advantageous not only in combination but also individually.

TABLE I

|  | Range (% by Wt) | Advantageous Composition (% by Wt) |
|---|---|---|
| $CaF_2$ | 46–60 | 49.5 |
| Calcined $Al_2O_3$ | 18–24 | 20.0 |
| $ZrO_2$ | 8–18 | 17.0 |
| $Na_3AlF_6$ | 5–9 | 7.0 |
| $Fe_3O_4$ | 3–4.5 | 3.5 |
| Mn | 1–2 | 1.5 |
| Ni/Nb | 0–2 | 0.5 |
| Cr/Mo | 0.25–2.0 | 1.0 |

Advantageously the wet ingredients will contain about 6% silica, about 2.2% total potassium and lithium oxide and about 0.4% carbon based upon the total solids in the liquid and dry blended solids. Thus when considered on a total composition basis, the advantageous amounts of ingredients set forth in Table I will decrease about 8% of the amount specified. Those skilled in the art will appreciate that during manufacture and especially during baking that minor subtle reactions will take place between the dry blended ingredients and the silicate binders. Thus it can be expected that trace to significant amounts of phases such as calcium, aluminum and zirconium silicates may be present in the baked flux. Furthermore, it is possible that baking will cause oxidation of sugar carbon leaving the flux deficient in carbon compared to the carbon actually present in the sugar in the mix.

It is an objective in formulating the flux of the present invention that minimal quantities, if any, of silicon are carried over from the flux to the weld deposit. In order to achieve this objective, it is important that the dry mix ingredients contain as little silicon as practical. For example, care should be taken to use and specify for use calcium fluoride, alumina and cryolite which are low in silica. In like manner because excess sulfur is detrimental to weld deposited nickel-base alloy, the flux ingredients should be as free as practical from sulfur-containing materials such as sulfates. Of course, the flux ingredients should not contain any amount more than a trace of any of the elements, metals or metalloids known to be detrimental to nickel-base alloys, for example, lead, antimony, arsenic, bismuth, tin, boron, sulfur and phosphorus.

In using the flux of the present invention in submerged-arc welding, normal welding technique is used. For welding an alloy such as INCONEL ™ alloy 625, it is recommended that a filler metal such as sold under the designation INCONEL ™ Filler Metal 625 be used. This filler metal has a composition in percent by weight as set forth in Table II.

TABLE II

|  | INCONEL Filler Metal 625 |
|---|---|
| Nickel (plus cobalt) | 58.0 min. |

TABLE II-continued

|  | INCONEL Filler Metal 625 |
|---|---|
| Carbon | 0.10 max. |
| Manganese | 0.50 max. |
| Iron | 5.0 max. |
| Sulfur | 0.015 max. |
| Silicon | 0.50 max. |
| Chromium | 20.0–23.0 |
| Niobium (plus tantalum) | 3.15–4.15 |
| Molybdenum | 8.0–10.0 |
| Aluminum | 0.40 max. |
| Phosphorus | 0.02 max. |
| Copper | 0.50 max. |
| Other | 0.50 max. |

The filler metal as set forth in Table II can also be used with the flux composition of the present invention for submerged-arc welding of dissimilar joints with nickel-chromium alloy, nickel-chromium-iron alloys, carbon steel, low alloy steel and stainless steels and for submerged-arc overlaying, e.g. on steel. Another filler metal which can be used with the flux of the present invention contains in percent by weight minimum 67% nickel, 2.5–3.5% manganese, maximum 3% iron, 18–22% chromium and 2–3% niobium along with small permissible amounts of silicon, copper, titanium, etc.

The ingredients of the flux of the present invention are particularly balanced so as to achieve the required metallurgical characteristics with respect to metal deposited from INCONEL TM Filler Metal 625. The contents of magnetite, manganese, nickel-niobium and chromium-molybdenum are especially important in this regard. Proper contents of calcium fluoride, alumina, zirconia and cryolite assure that slag characteristics including wettability, slag removal, smoothness of overlay top surface, etc. are maintained. Calcium fluoride in particular should not be too high because this leads to weld cracking.

In order to give those skilled in the art a greater appreciation of the invention the following example is given.

EXAMPLE

Three hundred forty-six and one-half parts by weight of low silicate calcium fluoride were dry blended with 140 parts by weight of calcined alumina, 119 parts by weight of zirconia, 48 parts by weight of cryolite, 24.5 parts by weight of magnetite, 10.5 parts by weight of electrolytic manganese powders, 7 parts by weight of chromium-molybdenum alloy powder and 3.5 parts by weight of nickel-niobium alloy powder. These dry blended ingredients were then mixed with 130.6 parts by weight of aqueous potassium silicate, 6.5 parts by weight of water, 3.25 parts by weight of lithium silicate and 13 parts by weight of a composition containing about 75% invert sugar-25% water. After thorough mixing, the composition was baked for 2 hours at about 540° C. Upon cooling the baked composition was then crushed to form flux particles of about 2 mm in average dimension.

Using INCONEL TM Filler Metal 625, submerged-arc, 50 mm thick butt welds were made on INCONEL TM alloy 625. The welds were capable of withstanding a 2T bend test and the weld deposited metal itself exhibited the room temperature characteristics as set forth in Table III.

TABLE III

| Ultimate Tensile Strength | 773.1 MPa |
|---|---|
| 0.2% Yield Strength | 466.5 MPa |
| Elongation | 43.0% |
| Reduction in Area | 40.0% |
| Hardness | 97 Rockwell "B" Scale |

In addition to providing satisfactory submerged-arc weld deposits with INCONEL TM alloy 625, the combination of the flux of the present invention and INCONEL TM Filler Metal 625 has provided satisfactory welds of 9% nickel steel to itself and satisfactory welds of a nominal 42% nickel, 21% chromium, 0.8% titanium, 3% molybdenum, 2% copper, balance mostly iron (INCOLOY TM alloy 825) to itself. The flux of the present invention can also be used in the submerged-arc welding of 65 nickel balance copper alloy.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

We claim:

1. A welding flux containing about 40–55% calcium fluoride, about 16–22% alpha alumina, about 7–16% zirconia, about 4.5–8% sodium aluminum fluoride, about 2.5–4% $Fe_3O_4$, about 0.8–1.8% manganese metal, up to about 1.8% of alloy consisting essentially of 40–60% niobium balance nickel, about 0.2–1.8% of alloy consisting essentially of about 30–70% chromium balance molybdenum, about 1.5–3% of alkali metal oxide, about 4–8% of silica and up to 0.6% carbon.

2. A welding flux as in claim 1 wherein the alkali metal oxide is a mixture of potassium oxide and lithia.

3. A welding flux as in claim 1 containing about 46% calcium fluoride, about 18.4% alumina, about 15.6% zirconia and about 6.4% cryolite.

4. A welding flux as in claim 3 containing about 3.2% $Fe_3O_4$, about 1.4% manganese metal, about 0.45% nickel-niobium alloy, and about 0.9% chromium-molybdenum alloy.

5. A process of submerged-arc welding employing the flux of claim 1.

* * * * *